US012592381B2

(12) United States Patent
Lai et al.

(10) Patent No.: US 12,592,381 B2
(45) Date of Patent: Mar. 31, 2026

(54) BATTERY CATHODE MATERIAL

(71) Applicants: HON HAI PRECISION INDUSTRY CO., LTD., New Taipei City (TW); SolidEdge Solution Inc., Hsinchu City (TW)

(72) Inventors: Hong-Zheng Lai, Hsinchu City (TW); Tseng-Lung Chang, Hsinchu City (TW)

(73) Assignees: HON HAI PRECISION INDUSTRY CO., LTD., New Taipei City (TW); SolidEdge Solution Inc., Hsinchu City (TW)

( * ) Notice: Subject to any disclaimer, the term of this patent is extended or adjusted under 35 U.S.C. 154(b) by 794 days.

(21) Appl. No.: 17/857,404

(22) Filed: Jul. 5, 2022

(65) Prior Publication Data

US 2023/0327083 A1 Oct. 12, 2023

(30) Foreign Application Priority Data

Apr. 6, 2022 (TW) .................................. 111113124

(51) Int. Cl.
H01M 4/36 (2006.01)
H01M 4/505 (2010.01)
(Continued)

(52) U.S. Cl.
CPC ........... H01M 4/366 (2013.01); H01M 4/505 (2013.01); H01M 4/525 (2013.01);
(Continued)

(58) Field of Classification Search
CPC .... H01M 4/366; H01M 4/525; H01M 4/5825; H01M 4/131; H01M 4/136; H01M 4/62;
(Continued)

(56) References Cited

U.S. PATENT DOCUMENTS

2020/0280093 A1 9/2020 Sakamoto et al.
2022/0020974 A1 1/2022 Yersak et al.

FOREIGN PATENT DOCUMENTS

CN 105247101 A 1/2016
CN 109860550 A 6/2019
(Continued)

*Primary Examiner* — Laura Weiner

(74) *Attorney, Agent, or Firm* — CKC & Partners Co., LLC

(57) ABSTRACT

A battery cathode material includes cathode material, ceramic material, and carbon-containing gel. The cathode material includes lithium nickel cobalt manganese oxide (NCM), lithium nickel cobalt aluminum oxide (NCA), lithium nickel manganese oxide (LNMO), lithium cobalt oxide (LCO), lithium iron phosphate (LFP), lithium nickel cobalt manganese aluminum oxide (NCMA), or combinations thereof. The ceramic material surrounds the cathode material, and includes gallium, aluminum, or tantalum doped lithium lanthanum zirconium oxide (LLZO), lithium zinc titanate (LZTO), lithium aluminum titanium phosphate (LATP), lithium-zirconium phosphate (LZPO), lithium zirconate (LZO), or combinations thereof. The carbon-containing gel wrapping the cathode material, and includes binder and carbon-containing conductive material, in which the binder includes polyvinylpyrrolidone, polyvinyl alcohol, sodium dodecyl sulfonate, sodium dodecylbenzenesulfonate, glucose, carboxymethyl cellulose, alginate, or combinations thereof, and the carbon-containing conductive material includes carbon nanotube.

12 Claims, 7 Drawing Sheets

(51) Int. Cl.
  *H01M 4/525*      (2010.01)
  *H01M 4/58*      (2010.01)
  *H01M 4/62*      (2006.01)
  *H01M 4/02*      (2006.01)

(52) U.S. Cl.
  CPC ......... *H01M 4/5825* (2013.01); *H01M 4/621*
      (2013.01); *H01M 4/622* (2013.01); *H01M*
      *4/625* (2013.01); *H01M 2004/021* (2013.01);
      *H01M 2004/023* (2013.01); *H01M 2004/028*
      (2013.01)

(58) Field of Classification Search
  CPC ...... H01M 4/622; H01M 4/621; H01M 4/625;
          H01M 2004/028; H01M 2004/021
  See application file for complete search history.

(56)              References Cited

FOREIGN PATENT DOCUMENTS

| CN | 110165152 | A  | 8/2019  |
|----|-----------|----|---------|
| CN | 111834620 | A  | 10/2020 |
| CN | 113363415 | A  | 9/2021  |
| CN | 113745455 | A  | 12/2021 |
| CN | 113745638 | A  | 12/2021 |
| DE | 102016215070 | A1 | 2/2018  |

100

200

300

400

500 mixing a positive electrode material, a ceramic material, a binder, and a carbon-containing conductive material to form a mixed mass     ~510 spray drying the mixed mass to form a composite     ~520 sintering the composite     ~530

502

504

506

300a

=

20

+

30

+

10

510

BATTERY CATHODE MATERIAL

CROSS-REFERENCE TO RELATED APPLICATION

This application claims priority to Taiwan Application Serial Number 111113124, filed Apr. 6, 2022, which is herein incorporated by reference in its entirety.

BACKGROUND

Field of Invention

The present disclosure is related to a battery cathode material and a method of preparing the same.

Description of Related Art

Batteries are usually formed by placing positive and negative electrodes in an electrolyte. The positive electrode, also known as a cathode, undergoes a reduction reaction in which the conductive ions, such as Li$^+$, are reduced to uncharged atoms, such as Li. On the other hand, the negative electrode, also known as an anode, undergoes an oxidation reaction during discharge. In general, the positive electrode material is made mixing the positive conductive unit with the conductive paste and applying it to the electrode sheet and assembling it into a battery. To increase overall ionic and electronic conductivity, the cathode material must have good electrical conductivity and can stabilize a large number of conductive ions, such as Li$^+$.

Solid-state batteries replace the conventional liquid electrolyte with a solid-state electrolyte. However, under the condition of densely pressed electrode sheets and no liquid electrolyte for ion conduction, the lithium migration efficiency of cathode is poor, and it cannot effectively perform its expected capacity and charging/discharging condition. Therefore, the present disclosure provides a cathode material to improve the energy performance and rate capability of cathodes in the solid-state battery.

SUMMARY

According to various embodiments of the present disclosure, there is provided a battery cathode material including a cathode material, a ceramic material, and a first carbon-containing gel. The cathode material includes lithium nickel cobalt manganese oxide, lithium nickel cobalt aluminum oxide, lithium nickel manganese oxide, lithium cobalt oxide, lithium iron phosphate, lithium nickel cobalt manganese aluminum oxide, or combinations thereof. The ceramic material surrounds the cathode material and includes gallium-, aluminum-, or tantalum-doped lithium lanthanum zirconium oxide, lithium zinc titanate, lithium aluminum titanium phosphate, lithium-zirconium phosphate, lithium zirconate, or combinations thereof. The first carbon-containing gel wraps the cathode material and includes a binder and a carbon-containing conductive material, in which the binder includes polyvinylpyrrolidone, polyvinyl alcohol, sodium dodecyl sulfonate, sodium dodecyl benzene sulfonate, glucose, carboxymethyl cellulose, alginate, or combinations thereof, and the carbon-containing conductive material includes a carbon nanotube.

According to some embodiments of the present disclosure, the weight ratio of the cathode material:the ceramic material:the binder:the carbon-containing conductive material is 100:0.5-2.5:0.1-1:0.1-0.5.

According to some embodiments of the present disclosure, the ratio of a particle size of the cathode material to a particle size of the ceramic material is about 4000-8000:50-350.

According to some embodiments of the present disclosure, the ceramic material is attached to a surface of the cathode material, and the first carbon-containing gel wraps the ceramic material and the cathode material.

According to some embodiments of the present disclosure, the first carbon-containing gel wraps a surface of the cathode material, and the ceramic material is attached on to the first carbon-containing gel.

According to some embodiments of the present disclosure, the cathode material and the ceramic material are dispersed in the first carbon-containing gel, and the first carbon-containing gel wraps the cathode material and the ceramic material.

According to some embodiments of the present disclosure, the battery cathode material further includes a second carbon-containing gel wrapping the cathode material, the ceramic material, and the first carbon-containing gel.

According to some embodiments of the present disclosure, the carbon nanotube has a length of about 0.5 μm to about 15 μm.

According to some embodiments of the present disclosure, the carbon nanotube includes about 70 wt % to 80 wt % of a first carbon nanotube, about 10 wt % to 20 wt % of a second carbon nanotube, and about 0 wt % to 10 wt % of a third carbon nanotube.

According to some embodiments of the present disclosure, the first carbon nanotube has a length of less than about 1 μm, the second carbon nanotube has a length of about 1 μm to less than 8 μm, and the third carbon nanotube has a length of about 8 μm to 15 μm.

According to various embodiments of the present disclosure, there is provided a method of preparing a battery cathode material, including mixing a cathode material, a ceramic material, a binder, and a carbon-containing conductive material to form a mixed mass, in which the cathode material includes lithium nickel cobalt manganese oxide, lithium nickel cobalt aluminum oxide, lithium nickel manganese oxide, lithium cobalt oxide, lithium iron phosphate, lithium nickel cobalt manganese aluminum oxide, or combinations thereof, the ceramic material includes gallium-, aluminum-, or tantalum-doped lithium lanthanum zirconium oxide, lithium zinc titanate, lithium aluminum titanium phosphate, lithium-zirconium phosphate, lithium zirconate, or combinations thereof, the binder includes polyvinylpyrrolidone, polyvinyl alcohol, sodium dodecyl sulfonate, sodium dodecyl benzene sulfonate, glucose, carboxymethyl cellulose, alginate, or combinations thereof, and the carbon-containing conductive material includes a carbon nanotube; spray drying the mixed mass to form a composite; and sintering the composite.

According to some embodiments of the present disclosure, mixing the cathode material, the ceramic material, the binder, and the carbon-containing conductive material includes mixing the cathode material with a first carbon-containing gel to form a cathode material precursor, in which the first carbon-containing gel includes a first binder and a first carbon-containing conductive material; mixing the ceramic material with a second carbon-containing gel to form a ceramic material gel, in which the second carbon-containing gel includes a second binder and a second carbon-containing conductive material; and mixing the cathode material precursor with the ceramic material gel.

According to some embodiments of the present disclosure, mixing the cathode material, the ceramic material, the binder, and the carbon-containing conductive material includes mixing the cathode material with a carbon-containing gel to form a cathode material precursor, in which the carbon-containing gel includes the binder and the carbon-containing conductive material; and mixing the ceramic material and a solvent with the cathode material precursor.

According to some embodiments of the present disclosure, sintering the composite includes sintering at a temperature of about 800° C.-880° C. in an inert gas.

BRIEF DESCRIPTION OF THE DRAWINGS

When reading the accompanying drawings, the detailed description below provides a full understanding of the various aspects of the present disclosure. It is worth noting that according to standard practice in the industry, various features are not drawn on a scale. In fact, for discussion clearly, the size of various features can be arbitrarily increased or decreased.

DETAILED DESCRIPTION

Figure 1:
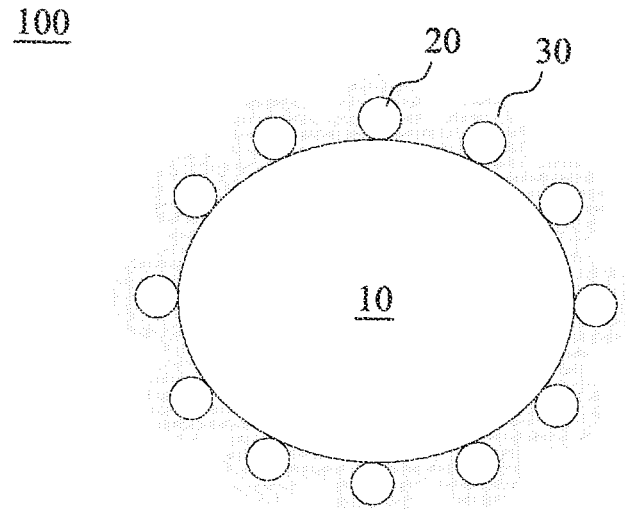
FIG. 1 is a schematic diagram of a battery cathode material according to some embodiments of the present disclosure.

A plurality of embodiments of the present disclosure will be disclosed in the figures below. For clear illustration, many practical details will be described together in the following description. However, it should be noted that these practical details should not limit the present disclosure. That is, in some embodiments of the present disclosure, these practical details are not essential. Moreover, for clear illustration, the size or thickness of the component may be exaggerated and not drawn in the original dimension. In addition, for simplification of drawings, some of the customary structures and components are drawn in an illustrative manner in the figures.

Spatially relative terms, such as below, above, etc., are used herein. As shown in the figures, they facilitate the description of the relationship between one component or feature and another component or feature. The interpretation of these spatially relative terms includes orientations otherwise. For example, when the drawing is turned 180 degrees upside down, the spatially relative term to describe the relationship between one component and another component may change from below to above. Therefore, the spatially relative term used herein should be interpreted accordingly.

FIG. 1 is a schematic diagram of a battery cathode material 100 according to some embodiments of the present disclosure. As shown in FIG. 1, the battery cathode material 100 includes a cathode material 10, a ceramic material 20, and a carbon-containing gel 30. The ceramic material 20 is attached to a surface of the cathode material 10, and the carbon-containing gel 30 wraps the ceramic material and the cathode material 10. Specifically, the carbon-containing gel 30 forms a thin layer wrapping the surfaces of the ceramic material 20 and the cathode material 10.

The cathode material 10 includes lithium nickel cobalt manganese oxide (NCM), lithium nickel cobalt aluminum oxide (NCA), lithium nickel manganese oxide (LNMO), lithium cobalt oxide (LCO), lithium iron phosphate (LFP), lithium nickel cobalt manganese aluminum oxide (NCMA), or combinations thereof, or combinations of polycrystalline and monocrystalline. Herein, the combinations of polycrystalline and monocrystalline refer to the combinations of polycrystalline of the above materials, the combinations of monocrystalline of the above materials, and the combinations of both polycrystalline and monocrystalline of the above materials. In some embodiments, the cathode material 10 may be a 1:1 mix of LCO and NCM or a 1:1 mix of LCO and NCMA. In some embodiments, the cathode material 10 has a particle size of about 4 μm to 8 μm. The particle size of the cathode material 10 has an impact on the battery rate and capacity. When the particle size is less than 4 μm, it may be difficult to mix uniformly due to large specific surface area. When the particle size is greater than 8 μm, the stacking density of cathode material 10 on the electrode plate may poor and it may be unfavorable to the coating and rolling processes. The stacking condition of the cathode material 10 on the positive electrode plate will affect the battery energy density.

The ceramic material 20 includes lithium lanthanum zirconium oxide (LLZO), lithium zinc titanate (LZTO), lithium aluminum titanium phosphate (LATP), lithium-zirconium phosphate (LZPO), lithium zirconate (LZO), or combinations thereof, that are doped with gallium, aluminum, or tantalum. In some embodiments, the doping ratio of gallium, aluminum, and tantalum in gallium-, aluminum-, or tantalum-doped lithium lanthanum zirconium oxide is 1-0.8:0.2-0.05:0.1-0.05. In some embodiments, the ceramic material 20 has a particle size of about 50 nm to 350 nm. When the particle size is less than 50 nm, the active substance of the ceramic material 20 tends to react with the ambient moisture and solvent during the mixing process and becomes passivated, thus losing the effect of enhancing ionic conductivity. If the particle size of the ceramic material 20 is too large, the cathode material 10 may wrap the surface of the ceramic material 20, resulting in difficulty in uniform bonding between the materials. In some embodiments, the particle size ratio of the cathode material 10 to the ceramic material 20 is about 4000-8000:50-350. Specifically, the suitable particle size of the ceramic material may be selected depending on the particle size of the cathode material 10 used. If the particle of ceramic material 20 that wraps the cathode material 10 is too large, it may cause uneven wrapping or over-thick wrapping, making the conductive path too far and causing the counter-effect. Selecting the cathode material 10 and ceramic material 20 within the above particle size ratio range has a more suitable wrapping during the mixing and wrapping, so that the wrapping on the surface of the cathode material 10 is more complete, and the thickness after sintering is more uniform. In some embodiments, a weight of the ceramic material is 0.5% to 10% of a weight of the cathode material 10. The cathode material 10 is the source of lithium ions. If too much of the ceramic material 20 is used, the capacity source may be reduced and the effective capacity may be lowered. If the proportion ceramic material 20 is too small, the lithium-ion conductivity may not be enhanced and there is no effect of protecting the cathode material 10 and enhancing the capacity drawing rate. By modifying the ceramic material 20 modified on the surface of the cathode material 10, a path for lithium ions to move can be provided, allowing lithium ions inside the cathode material 10 to be more quickly deintercalated and intercalated, further improving the lithium-ion conductivity and overall electrical conductivity of the battery cathode material 100.

The carbon-containing gel 30 includes a binder and a carbon-containing conductive material (not shown). Specifically, the carbon-containing conductive material may be distributed in the binder. In some embodiments, the binder includes polyvinylpyrrolidone, polyvinyl alcohol, sodium dodecyl sulfonate, sodium dodecyl benzenesulfonate, glucose, carboxymethyl cellulose, alginate, or combinations thereof. In some embodiments, the binder carbonizes after sintering to form a conductive carbon source. The binder forms carbon coating on the cathode material 10 during carbonization to improve the poor conductivity of the cathode material 10. Therefore, the amount of binder will affect the thickness and effectiveness of the carbon coating. In some embodiments, the weight of the binder is 0.5% to 2.5% of the cathode material 10. When the content of the binder is too high, the carbon coating may be too thick, resulting in poor capacity drawing rate and high irreversible capacitance. When the content of the binder is too low, the carbon coating may be too thin, resulting in insufficient electrical conductivity and poor capacity drawing rate. In some embodiments, the binder makes the carbon-containing conductive material dispersed therein wrap the surfaces of the cathode material 10 and the ceramic material 20 to form a conductive path. Therefore, too less binder is hard to effectively bond the ceramic material 20 and the cathode material 10.

In some embodiments, the carbon-containing conductive material includes a carbon nanotube. In some embodiments, the carbon nanotube may be a single-walled carbon nanotube, a multi-walled carbon nanotube, or a combination thereof. In some embodiments, the carbon nanotube may have a length of about 0.5 μm to 15 μm. In some embodiments, the carbon-containing conductive material includes about 70 wt % to 80 wt % of a first carbon nanotube, about 10 wt % to 20 wt % of a second carbon nanotube, and about 0 wt % to 10 wt % of a third carbon nanotube. In some embodiments, the first carbon nanotube, the second carbon nanotube, and the third carbon nanotube have different lengths. In some embodiments, the first carbon nanotube has a length of less than about 1 μm, the second carbon nanotube has a length of about 1 μm to less than 8 μm, and the third carbon nanotube has a length of about 8 μm to 15 μm. For example, the carbon nanotubes with a length of less than about 1 μm provide surface conductivity of the battery cathode material 100; the carbon nanotubes with a length of about 1 μm to less than 8 μm provide a conductive bridge to the subspace within the sphere of the battery cathode material 100; the carbon nanotubes with a length of about 8 μm to 15 μm provide conductive wrapping and expansion inhibition of the entire sphere of the battery cathode material

100. In some embodiments, the weight of the carbon-containing conductive material is 0.1% to 0.5% of the cathode material 10. The carbon-containing conductive material can form a conductive bridge around the cathode material 10 and the ceramic material 20, allowing electrons to be conducted between different cathode materials 10. By using the carbon-containing conductive material, the electrical conductivity can be improved, as well as the cycle performance and the thermal stability performance of the battery cathode material 100. The much carbon-containing conductive material leads to poor capacity drawing rate and high irreversible capacitance. Too less carbon-containing conductive material cannot improve the conductivity effectively. In some embodiments, the weight ratio of the cathode material 10:the ceramic material 20:the binder:the carbon-containing conductive material is 100:0.5-2.5:0.1-1:0.1-0.5.

Figure 2:
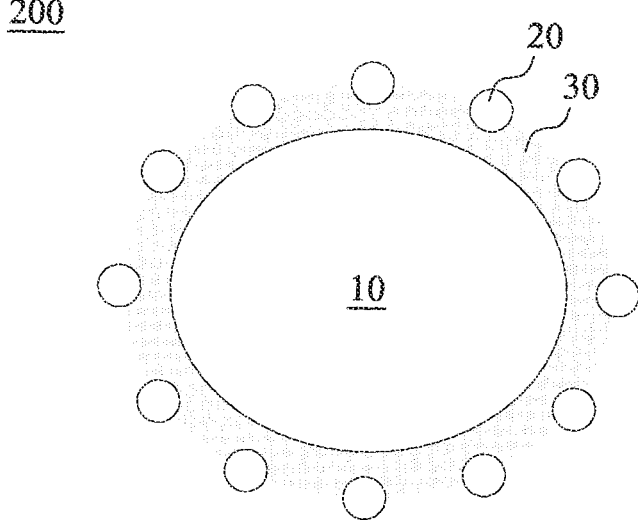
FIG. 2 is a schematic diagram of a battery cathode material according to some embodiments of the present disclosure.

FIG. 2 is a schematic diagram of a battery cathode material 200 according to some embodiments of the present disclosure. As shown in FIG. 2, the battery cathode material 200 includes a cathode material 10, a ceramic material 20, and a carbon-containing gel 30. Specifically, the carbon-containing gel 30 forms a thin layer wrapping the surface of the cathode material 10, and the ceramic material 20 further attaches to the carbon-containing gel 30. The carbon-containing gel 30 includes a binder and a carbon-containing conductive material (not shown). The carbon-containing conductive material can be distributed in the binder. In some embodiments, the binder makes the carbon-containing conductive material dispersed therein wrap the surface of the cathode material 10. Moreover, through the binder, the ceramic material 20 attaches to the surface of the cathode material 10 to form a conductive path. The details of particle size, material, and composition ratio of the cathode material 10, the ceramic material 20, and the carbon-containing gel 30 of the battery cathode material 200 can be referred to the embodiment of the battery cathode material 100 above and are not repeated here.

Figure 3:
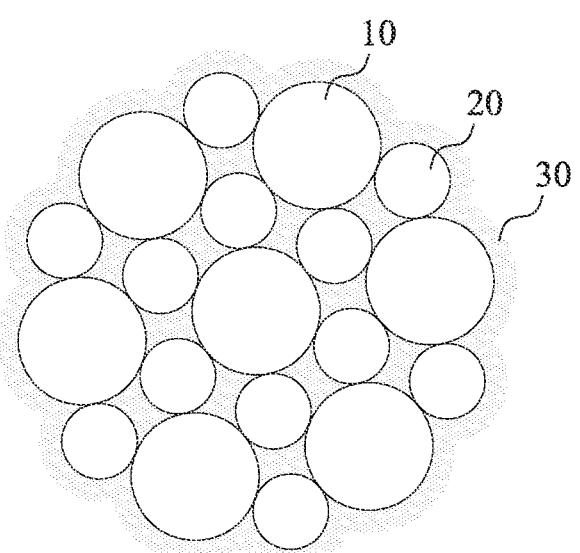
FIG. 3 is a schematic diagram of a battery cathode material according to some embodiments of the present disclosure.

FIG. 3 is a schematic diagram of a battery cathode material 300 according to some embodiments of the present disclosure. As shown in FIG. 3, the battery cathode material 300 includes a cathode material 10, a ceramic material 20, and a carbon-containing gel 30. Specifically, the cathode material 10 and the ceramic material 20 are dispersed in the carbon-containing gel 30, and the carbon-containing gel 30 forms a thin layer wrapping the surfaces of the cathode material 10 and the ceramic material 20. A carbon-containing conductive material can be distributed in a binder. In some embodiments, the binder makes the carbon-containing conductive material dispersed therein wrap the surfaces of the cathode material 10 and the ceramic material 20, allowing the cathode material 10 and the ceramic material 20 to adhere together to form a conductive path. The details of particle size, material, and composition ratio of the cathode material 10, the ceramic material 20, and the carbon-containing gel 30 in the battery cathode material 300 can be referred to the embodiment of the battery cathode material 100 above and are not repeated here.

Figure 4:
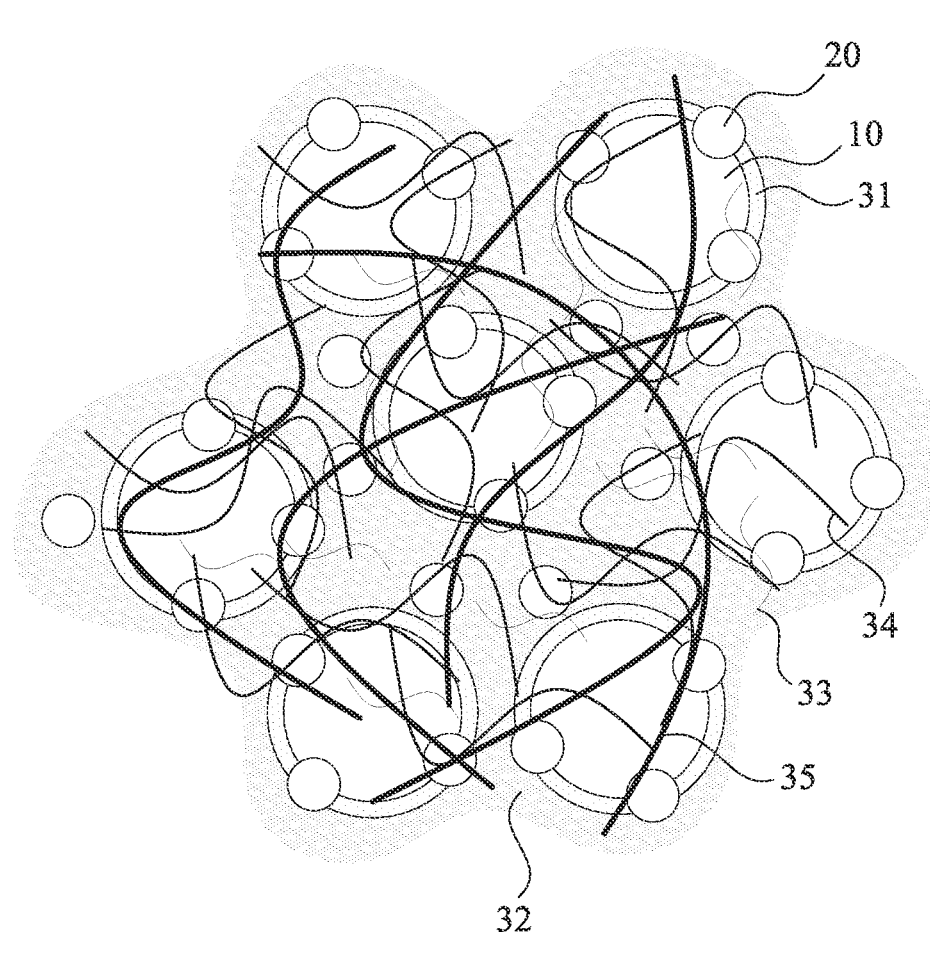
FIG. 4 is a schematic diagram of a battery cathode material according to some embodiments of the present disclosure.

FIG. 4 is a schematic diagram of a battery cathode material 400 according to some embodiments of the present disclosure. As shown in FIG. 4, the battery cathode material 400 includes a cathode material 10, a ceramic material 20, a first carbon-containing gel 31, and a second carbon-containing gel 32. A portion of the ceramic material 20 is attached to the surface of the cathode material 10, and the first carbon-containing gel 31 forms a thin layer wrapping the ceramic material 20 and the cathode material 10. A portion of the ceramic material 20 is dispersed in the second carbon-containing gel 32, and the second carbon-containing gel 32 further wraps the cathode material 10, the ceramic material 20, and the first carbon-containing gel 31. The details of size, material, and composition ratio of the cathode material 10 and the ceramic material 20 in the battery cathode material 400 can be referred to the embodiment of the battery cathode material 100 above and are not repeated here.

The first carbon-containing gel 31 and the second carbon-containing gel 32 may respectively include a binder and a carbon-containing conductive material. In some embodiments, the carbon-containing conductive material may include carbon nanotubes 33, 34, 35 of different lengths as shown in FIG. 4. For example, the carbon-containing conductive material may include 70 wt % to 80 wt % of the carbon nanotube 33, 10 wt % to 20 wt % of the carbon nanotube 34, and 0 wt % to 10 wt % of the carbon nanotubes 35. In some embodiments, the carbon nanotube 33 has a length of less than about 1 µm, the carbon nanotube 34 has a length of about 1 µm to less than 8 µm, and the carbon nanotube 35 has a length of about 8 µm to 15 µm. In some embodiments, the material, composition ratio, and/or thickness of the first carbon-containing gel 31 may be the same as those of the second carbon-containing gel 32. In other embodiments, the material, composition ratio, and/or thickness of the first carbon-containing gel 31 may be different from those of the second carbon-containing gel 32. The details of the material and content of the binder and the content of the carbon nanotubes 33, 34, 35 can be referred to the embodiment of the battery cathode material 100 above and are not repeated here.

Figure 5:
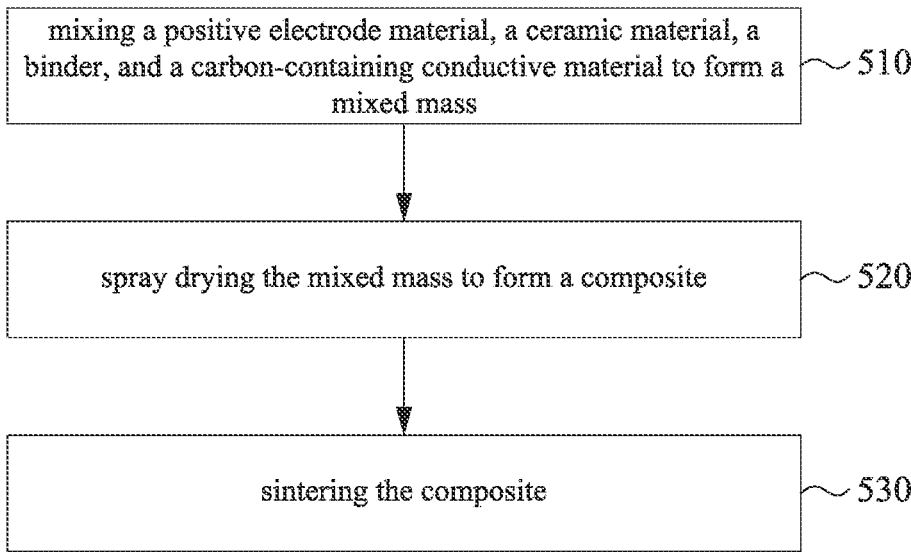
FIG. 5 is a flowchart of a method of preparing a battery cathode material according to some embodiments of the present disclosure.

FIGS. 5 to 8 are flowcharts of a method 500 of preparing the battery cathode material according to some embodiments of the present disclosure. As shown in FIG. 5, the method 500 includes operations 510, 520, and 530.

Figure 6:
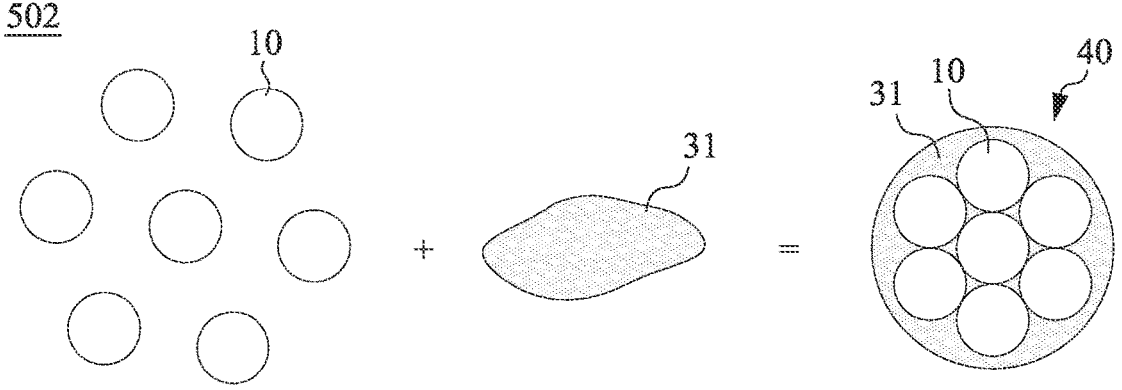
FIG. 6 is a schematic flowchart of a manufacturing method of battery cathode material according to some embodiments of the present disclosure.
Figure 6:
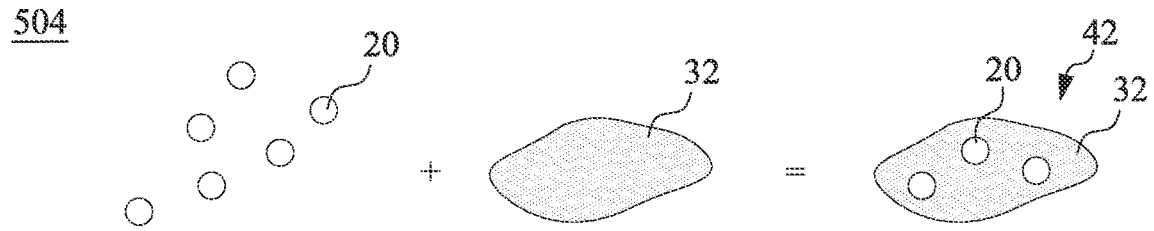
Figure 6:
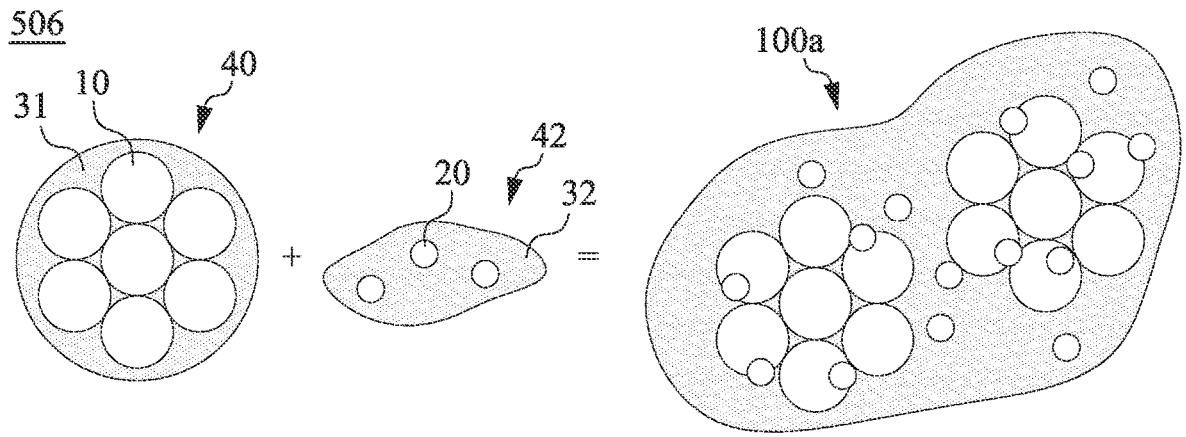

Referring first to FIGS. 5 and 6, the method of preparing the battery cathode material 100 (as shown in FIG. 1) is described. In the operation 510 of the method 500, the cathode material 10, the ceramic material 20, the binder, and the carbon-containing conductive material are mixed to form a mixed mass 100a.

As shown in FIG. 6, the operation 510 may include sub-operations 502, 504, and 506. In the sub-operation 502, the cathode material 10 is mixed with the first carbon-containing gel 31 to form a cathode material precursor 40. In some embodiments, the first carbon-containing gel 31 includes a first binder and a first carbon-containing conductive material. The cathode material 10, the first binder, and the first carbon-containing conductive material may be any of the above-described cathode materials, binders, and carbon-containing conductive materials, which are not repeated herein. In some embodiments, mixing the cathode material 10 with the first carbon-containing gel 31 is performed at a temperature of about 30° C. to 40° C. In some embodiments, the cathode material 10 and the first carbon-containing gel 31 may be mixed and emulsified for 30 minutes to form a mixed gel. Afterwards, the mixed gel is spray dried to form the cathode material precursor 40.

Referring further to FIG. 6, in the sub-operation 504, the ceramic material 20 is mixed with the second carbon-containing gel 32 to form a ceramic material gel 42. In some embodiments, the second carbon-containing gel 32 includes a second binder and a second carbon-containing conductive material. The ceramic material 20, the second binder, and the second carbon-containing conductive material may be any of the above-described ceramic materials, binders, and carbon-containing conductive materials, which are not repeated herein. In some embodiments, the second carbon-containing gel 32 may be the same as the first carbon-containing gel 31. In other embodiments, the second carbon-containing gel 32 is different from the first carbon-containing gel 31. In some embodiments, mixing the ceramic material 20 with the second carbon-containing gel 32 is performed at a temperature of about 25° C. to 45° C. In some embodiments, the ceramic material 20 and the second carbon-containing gel 32 may be mixed and emulsified for 1 hour to form the homogeneously mixed ceramic material gel 42.

Thereafter, in the sub-operation 506, the cathode material precursor 40 and the ceramic material gel 42 are mixed to form a mixed mass 100a. In some embodiments, the cathode material precursor 40 and the ceramic material gel 42 are mixed in a planetary mixer at a speed of about 800 rpm for 1 hour.

Referring further to FIG. 5, in the operation 520 of the method 500, the mixed mass 100a is spray dried to form a composite. Specifically, the composite may have the structure shown in FIG. 1. In some embodiments, after spray drying the mixed mass 100a, a powder-like composite is formed. The composite may have the ceramic material 20 attached to the surface of the cathode material 10, while the carbon-containing gel wraps the cathode material 10 and the ceramic material 20.

In the operation 530 of the method 500, the composite is sintered. In some embodiments, sintering the composite includes sintering in an inert gas at a temperature of about 800° C. to 880° C. For example, the temperature is increased to 800° C.-880° C. at a heating rate of 5° C./min under nitrogen (with 2 L/min feed), and thereafter, the temperature is maintained to sinter the composite for about 6 hours to form the battery cathode material 100 as shown in FIG. 1.

Figure 7:
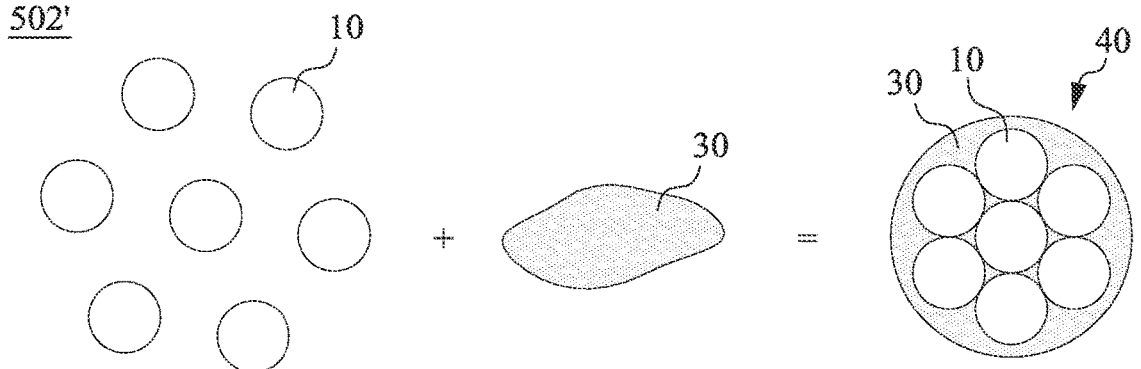
FIG. 7 is a schematic flowchart of a method of preparing a battery cathode material according to some embodiments of the present disclosure.
Figure 7:
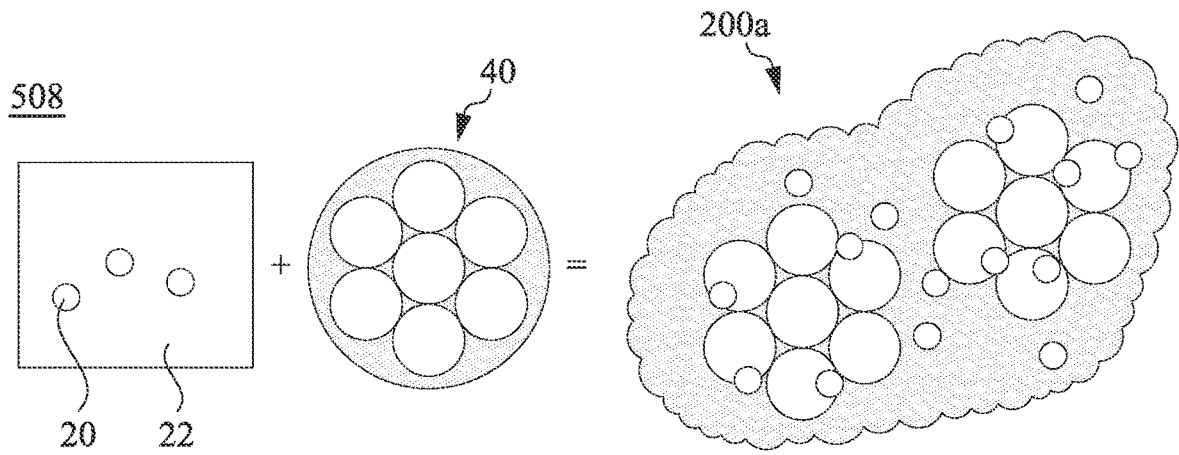

Referring to FIG. 5 and FIG. 7, the method of preparing the battery cathode material 200 (as shown in FIG. 2) is described. In the operation 510 of the method 500, the cathode material 10, the ceramic material 20, the binder, and the carbon-containing conductive material are mixed to form a mixed mass 200a.

As shown in FIG. 7, the operation 510 may include sub-operations 502' and 508. In the sub-operation 502', the cathode material 10 is mixed with the carbon-containing gel 30 to form the cathode material precursor 40. In some embodiments, the carbon-containing gel 30 includes a binder and a carbon-containing conductive material. The cathode material 10, the binder, and the carbon-containing conductive material may be any of the above-described cathode materials, binders, and carbon-containing conductive materials, which are not repeated herein. In some embodiments, the cathode material 10 and the first carbon-containing gel 31 may be mixed and emulsified for 30 minutes to form a mixed gel. Afterwards, the mixed gel is spray dried to form the cathode material precursor 40.

Referring further to FIG. 7, in the sub-operation 508, the ceramic material 20 and a solvent 22 are mixed with the cathode material precursor 40. In some embodiments, the solvent 22 is an anhydrous solvent or a low water content solvent (less than about 200 ppm), including ethanol, isopropanol, dimethylacetamide (DMAC), methylpyrrolidone (NMP), ethyl acetate (EA), and dimethylformamide (DMF), and the like, or combinations thereof. In some embodiments, the ceramic material 20 may be placed in the solvent first, and then mixed with the cathode material precursor 40 to form the mixed mass 200a. In some embodiments, the cathode material precursor 40, the ceramic material 20, and the solvent 22 were mixed in a planetary mixer at a speed of about 800 rpm for 1 hour.

Referring further to FIG. 5, in the operation 520 of the method 500, the mixed mass 200*a* is spray dried to form a composite. Specifically, the composite may have the structure shown in FIG. 2. In some embodiments, after spray drying the mixed mass 200*a*, a powder-like composite is formed. The composite may have the carbon-containing gel 30 wrapping the cathode material 10, and the ceramic material 20 attached to the cathode material 10 by the carbon-containing gel 30.

In the operation 530 of the method 500, the composite is sintered. In some embodiments, sintering the composite includes sintering in an inert gas at a temperature of about 800° C. to 880° C. For example, the temperature is increased to 800° C.-880° C. at a heating rate of 5° C./min under nitrogen (with 2 L/min feed), and thereafter, the temperature is maintained to sinter the composite for about 6 hours to form the battery cathode material 200 as shown in FIG. 2.

Figure 8:
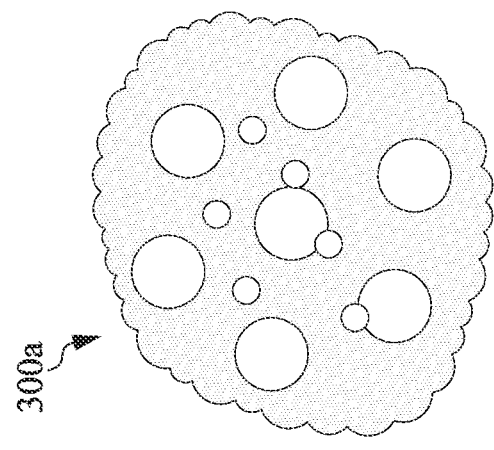
FIG. 8 is a schematic flowchart of a method of preparing a battery cathode material according to some embodiments of the present disclosure.
Figure 8:
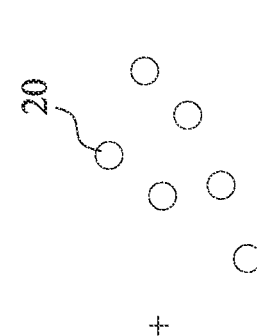
Figure 8:
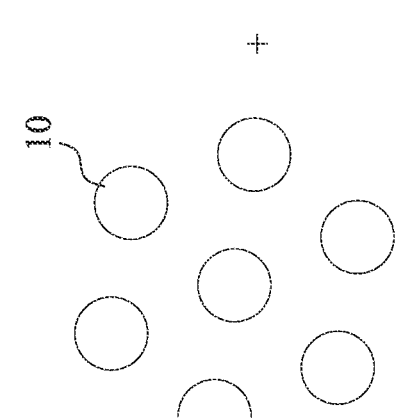
Figure 8:
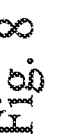

Referring to FIG. 5 and FIG. 8, the method of preparing the battery cathode material 300 (as shown in FIG. 3) is described. In the operation 510 of the method 500, the cathode material 10, the ceramic material 20, the binder, and the carbon-containing conductive material are mixed to form a mixed mass 300*a*. As shown in FIG. 8, the cathode material 10, the ceramic material 20, and the carbon-containing gel 30 are mixed. In some embodiments, the carbon-containing gel 30 includes a binder and a carbon-containing conductive material. The cathode material 10, the ceramic material 20, the binder, and the carbon-containing conductive material may be any of the above-mentioned cathode materials, ceramic materials, binders, and carbon-containing conductive materials, which are not repeated herein. In some embodiments, the cathode material 10, the ceramic material 20, and the carbon-containing gel 30 are mixed and emulsified for 2 hours to form a mixed gel.

Referring further to FIG. 5, in the operation 520 of method 500, the mixed mass 300*a* is spray dried to form a composite. Specifically, the composite may have the structure shown in FIG. 3. In some embodiments, after spray drying the mixed mass 300*a*, a powder-like composite is formed. The composite may have the cathode material 10 and the ceramic material 20 dispersed in the carbon-containing gel 30 and wrapped by the carbon-containing gel 30.

In the operation 530 of the method 500, the composite is sintered. In some embodiments, sintering the composite includes sintering in an inert gas at a temperature of about 800° C. to 880° C. For example, the temperature is increased to 800° C.-880° C. at a heating rate of 5° C./min under nitrogen (with 2 L/min nitrogen feed), and thereafter, the temperature is maintained to sinter the composite for about 6 hours to form the battery cathode material 300 as shown in FIG. 3.

As described above, according to the embodiments of the present disclosure, there are provided the battery cathode material and the method of preparing the same. The battery cathode material of the present disclosure is ceramic material-modified and the ceramic material is bound to the surface of the cathode material. By adding nano- or micronized ceramic material, a path for lithium ions to move can be provided. In other words, the conductivity can be increased by establishing a conductive path through the ceramic material. Therefore, when the battery cathode material is applied to the solid-state battery, the lithium-ion conduction and the overall conductivity can be improved, which in turn improves the energy performance and the rate capacity of the solid-state battery.

The present disclosure has been disclosed in the embodiments mentioned above. However, it is not intended to limit the present disclosure. One skilled in the art can make various changes and modifications without departing from the spirit and scope of the present disclosure. The scope of protection of the present disclosure is defied by the scope of the patent application attached as follows.

What is claimed is:

1. A battery cathode material, comprising:
   a cathode particle comprising lithium nickel cobalt manganese oxide, lithium nickel cobalt aluminum oxide, lithium nickel manganese oxide, lithium cobalt oxide, lithium iron phosphate, lithium nickel cobalt manganese aluminum oxide, or combinations thereof;
   at least one ceramic particle surrounding the cathode particle and comprising gallium-, aluminum-, or tantalum-doped lithium lanthanum zirconium oxide, lithium zinc titanate, lithium aluminum titanium phosphate, lithium-zirconium phosphate, lithium zirconate, or combinations thereof; and
   a first carbon-containing gel comprising a binder and a carbon-containing conductive material, wherein the binder comprises polyvinylpyrrolidone, polyvinyl alcohol, sodium dodecyl sulfonate, sodium dodecyl benzene sulfonate, glucose, carboxymethyl cellulose, alginate, or combinations thereof, the carbon-containing conductive material comprises a carbon nanotube, the carbon nanotube comprises about 70 wt % to 80 wt % of a first carbon nanotube, about 10 wt % to 20 wt % of a second carbon nanotube, and about 0 wt % to 10 wt % of a third carbon nanotube, the first carbon nanotube has a length of about 0.5 to 1 μm, the second carbon nanotube has a length of about 1 μm to less than 8 μm, and the third carbon nanotube has a length of about 8 μm to 15 μm;
   wherein
   (i) wherein the at least one ceramic particle is attached to a surface of the cathode particle, and the first carbon-containing gel wraps the at least one ceramic particle and the cathode particle; or
   (ii) wherein the first carbon-containing gel wraps a surface of the cathode particle, and the at least one ceramic particle is attached on to the first carbon-containing gel; or
   (iii) a wherein the cathode particle and the at least one ceramic particle are dispersed in the first carbon-containing gel, and the first carbon-containing gel wraps the cathode particle and the at least one ceramic particle.

2. The battery cathode material of claim 1, wherein a ratio of a particle size of the cathode particle to a particle size of the at least one ceramic particle is about 4000-8000: 50-350.

3. The battery cathode material of claim 1, wherein the at least one ceramic particle is attached to a surface of the cathode particle, and the first carbon-containing gel wraps the at least one ceramic particle and the cathode particle.

4. The battery cathode material of claim 1, wherein the first carbon-containing gel wraps a surface of the cathode particle, and the at least one ceramic particle is attached on to the first carbon-containing gel.

5. The battery cathode material of claim 1, wherein the cathode particle and the at least one ceramic particle are dispersed in the first carbon-containing gel, and the first carbon-containing gel wraps the cathode particle and the at least one ceramic particle.

6. The battery cathode material of claim 1, further comprising a second carbon-containing gel wrapping the cathode particle, the at least one ceramic particle, and the first carbon-containing gel.

7. The battery cathode material of claim 1, wherein a weight ratio of the cathode particle:the at least one ceramic particle:the binder:the carbon-containing conductive material is 100:0.5-2.5:0.1-1:0.1-0.5.

8. The battery cathode material of claim 7, wherein a ratio of a particle size of the cathode particle to a particle size of the at least one ceramic particle is about 4000-8000:50-350.

9. The battery cathode material of claim 7, wherein the at least one ceramic particle is attached to a surface of the cathode particle, and the first carbon-containing gel wraps the at least one ceramic particle and the cathode particle.

10. The battery cathode material of claim 7, wherein the first carbon-containing gel wraps a surface of the cathode particle, and the at least one ceramic particle is attached on to the first carbon-containing gel.

11. The battery cathode material of claim 7, wherein the cathode particle and the at least one ceramic particle are dispersed in the first carbon-containing gel, and the first carbon-containing gel wraps the cathode article and the at least one ceramic particle.

12. The battery cathode material of claim 7, further comprising a second carbon-containing gel wrapping the cathode particle, the at least one ceramic particle, and the first carbon-containing gel.

* * * * *